(12) United States Patent
Umeuchi et al.

(10) Patent No.: US 6,512,747 B1
(45) Date of Patent: Jan. 28, 2003

(54) ATM TRANSMISSION SYSTEM

(75) Inventors: Makoto Umeuchi, Tokyo (JP);
Masamitsu Nakura, Tokyo (JP);
Masahiro Umehira, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/262,111

(22) Filed: Mar. 4, 1999

(30) Foreign Application Priority Data

Mar. 5, 1998 (JP) .......................................... 10-053808

(51) Int. Cl.[7] .......................... H04B 7/00; H04L 12/28; H04L 12/56
(52) U.S. Cl. .................................. 370/310.1; 370/395.6
(58) Field of Search .............................. 370/310.1, 347, 370/395.1, 395.6, 395.65, 389, 394, 412; 714/748

(56) References Cited

U.S. PATENT DOCUMENTS 5,572,522 A * 11/1996 Calamvokis et al. ....... 370/390
5,764,641 A * 6/1998 Lin ............................. 370/412
6,151,299 A * 11/2000 Lyon et al. .................. 370/229
6,373,842 B1 * 4/2002 Coverdale et al. .......... 370/394

FOREIGN PATENT DOCUMENTS

JP 8-163141 6/1996
JP 10-135959 5/1998

OTHER PUBLICATIONS

WO 97/50276, Dec. 31, 1997.

* cited by examiner

Primary Examiner—Kwang Bin Yao
Assistant Examiner—Kevin C. Harper
(74) Attorney, Agent, or Firm—Arent Fox Kintner Plotkin & Kahn, PLLC

(57) ABSTRACT

In an ATM transmission system in which a plurality of ATM cells are grouped to a packet with an end of ATM cell having an EOP (End Of Packet) flag, a transmitting station comprises a transmit buffer for storing temporarily ATM cells to be transmitted, a transmit cell process means which discards all the ATM cells in the group in case that a NAK response indicating loss or wrong reception of an ATM cell is received from a receiving station, and an EOP cell generator for transmitting an EOP cell which has said EOP flag in stead of the discarded ATM cells. As no ATM cell in a packet is transmitted after an erroneous ATM cell is detected, no useless ATM cell which would be discarded in a destination terminal equipment because of an erroneous ATM cell occupies a transmission line when an erroneous ATM cell is detected, and traffic is saved.

5 Claims, 15 Drawing Sheets

GFC: GENERIC FLOW CONTROL
VPI: VIRTUAL PATH IDENTIFIER
VCI: VIRTUAL CHANNEL IDENTIFIER
PT : PAYLOAD TYPE
CLP: CELL LOSS PRIORITY
HEC: HEADER ERROR CONTROL

ATM TRANSMISSION SYSTEM

BACKGROUND OF THE INVENTION

The present invention relates to an ATM (Asynchronous Transfer mode) transmission system for transmitting an ATM cell through a radio channel or a wired channel, in particular, relates to such a system which uses a communication channel with high efficiency and suppresses useless traffic.

In an ATM transmission system, a data is transmitted by using an ATM cell which has a fixed length of data. An ATM cell has generally 53 bytes data including a cell header having 5 bytes followed by an information field having 48 bytes, as shown in FIG. 5.

Since an ATM cell has fixed length, high speed data transmission is possible by repetition of relatively simple process.

In an ATM transmission system, an ATM cell is repeated by a node which is called an ATM switch so that the ATM cell is transmitted from a source terminal equipment to a destination terminal equipment. Assuming that an ATM switch has the function to discard a wrong ATM cell (as shown in Japanese patent laid open publication 163141/1996), when there is something wrong in an ATM cell, such as a queue of an ATM cell and/or overflow of a buffer memory, a useless traffic may be suppressed for a transmission line at an output side of the ATM switch, however, no transmission is suppressed in a transmission line at an input side of the ATM switch.

Further, in a prior art, the discard of an ATM cell is triggered by a long queue of an ATM cell in an ATM switch and an overflow of a buffer memory, but not by a transmission error of an ATM cell. A transmission error occurs with high probability in case of a wireless transmission line.

FIG. 11 shows a basic system structure of a wireless ATM system. In FIG. 11, the numeral 11 shows a base station, 12, 13 and 14 are a radio module, 15, 16 and 17 are a terminal equipment, and 18 shows a network.

In FIG. 11, the base station 11 is coupled with radio modules 12–14 through a wireless channel. Each of radio modules 12–14 is connected to a related terminal equipment 15–17. Further, the base station 11 is coupled with the network 18 through an optical fiber, or a metal cable.

The terminal equipment 15–17 and the network 18 carry out transmission and reception of data by using an ATM cell, which is the minimum unit of data to be transmitted.

FIG. 12 shows a protocol stack concerning a user plane (U plane) of a wireless ATM system of FIG. 11. The base station 11 is coupled with the network 18 through a node 19.

As shown in FIG. 12, the protocol of the terminal equipment 15–17 comprises a physical layer (PHY), an ATM layer (ATM), an ATM adaptation layer (AAL), and an application layer (AP). Each of the radio modules 12–14 and the base station 11 has the protocol comprising a physical layer (PHY), an ATM layer (ATM), a wireless layer (Wireless), a data link layer (DLC), and a media access control layer (MAC). The node 19 has a physical layer (PHY) and an ATM layer (ATM).

As for a U plane of the base station 11 and the radio modules 12–14, a layer higher than an ATM adaptation layer (AAL) is not terminated. The terminal equipment 15–17 are seamlessly coupled with the node 19 in the network 18 through the ATM layer (ATM). In a wireless channel between the base station 11 and the radio modules 12–14, a plurality of virtual paths (VP) and virtual channels (VC) which are a logical link of an ATM layer may exist.

FIG. 13 shows a flow of an ATM cell C1–C8 when a terminal equipment 15 transmits a network 18 a data, in a wireless ATM system in FIG. 11. In the embodiment of FIG. 13, a radio module 12 is a transmitter, a base station 11 is a receiver, and the terminal 15 is sending an ATM cell.

As shown in FIG. 13, it is assumed that the terminal 15 sends ATM cells C1 through C8 sequentially to the radio module 12, and that the second ATM cell C2 is erroneous in the wireless section between the radio module 12 and the base station 11, so that the base station 11 receives the first ATM cell C1 and the ATM cells C3 through C8. Then, the base station 11 sends the first ATM cell C1 and the cells C3 through C8 to the network 18.

A base station 11 and a radio module 12 have a transmitting station and a receiving station as shown in FIG. 14. A transmitting station comprises an input means for accepting an ATM cell, a transmit buffer, and a transmit means. The transmit buffer stores temporarily an ATM cell which is in the queue for transmission. A receiving station comprises a receive means, a receive buffer, and an output means. An ATM cell received by the receive means is stored temporarily in the receive buffer. An ATM cell is read out of the receive buffer when requested, and is transmitted through the output means.

FIG. 15 shows the transfer sequence of the ATM cells C1 through C8 in the wireless section in case of FIG. 13. In FIG. 15, a TDMA (Time Division Multiple Access) system is used in wireless data communication between a radio module 12 and a base station 11, and each TDMA frame includes three ATM cells.

In FIG. 15, when cells in a first TDMA frame are transmitted, a first through third ATM cells C1–C3 are transmitted. It is assumed that a second ATM cell C2 is erroneous in a wireless section. Therefore, the base station 11 receives only the first ATM cell C1 and the third ATM cell C3.

When the ATM cell in the first TDMA frame has been transmitted, the radio module 12 has five ATM cells C4, C5, C6, C7 and C8 in the transmit buffer. The fourth through sixth ATM cells C4–C6 are transmitted when the cells in the second TDMA frame is transmitted. Then, the base station 11 has five ATM cells C1, C3, C4, C5 and C6 in the receive buffer.

When the ATM cells in the second TDMA frame has been transmitted, the radio module 12 has two ATM cells C7 and C8 in the transmit buffer. Those two cells C7 and C8 are transmitted when the ATM cells in the third TDMA frame are transmitted.

As a result, the base station 11 receives seven ATM cells C1, C3, C4, C5, C6, C7 and C8. Then, the base station transmits the network 18 seven ATM cells C1, C3, C4, C5, C6, C7 and C8.

By the way, the recent network which uses an ATM communication system, can provide a variety of services. And, for instance, it is requested that a user terminal is seamlessly coupled with an ATM network including wireless means, in other words, it is requested that a user terminal is coupled with a network only through an ATM layer.

However, it should be noted that an ATM cell is erroneous with relatively high probability in a wireless communication section.

In a data communication service which uses an ATM system, a TCP/IP protocol is used in a higher layer. The communication using the TCP/IP protocol is implemented for instance by a standardized specification (IP over ATM; RFC 1483). In this case, AAL type 5 is used as an ATM adaptation layer (AAL).

In a data communication system using the AAL type 5 as the ATM adaptation layer, the size of a packet in a higher layer is generally larger than the data size (48 bytes) of an information field of an ATM cell, therefore, a packet in a higher layer is segmented to a plurality of ATM cells for transmission.

If an ATM cell or a plurality of ATM cells are in error in transmission, and an error correction by a destination terminal (forward error correction; FEC) can not recover a packet data, when a packet is transmitted in a plurality of ATM cells, then, a packet itself is in error, and it is dealt as a useless packet.

When re-transmission is carried out in a higher layer, the re-transmission of a whole packet must be carried out when only one ATM cell is erroneous. In this case, when a wireless section exists in a network, the probability of a non-useful packet might be relatively high, since the probability of an error of an ATM cell in a wireless section is high.

As described above, when an erroneous ATM cell is included in a packet which has a plurality of ATM cells, a whole packet must be discarded as a non-useless packet. Therefore, even correct ATM cells included in an erroneous packet might be discarded. The transmission of correct ATM cells which are to be discarded because of an erroneous ATM cell in the packet decreases the traffic efficiency in a communication line.

SUMMARY OF THE INVENTION

It is an object of the present invention to provide a new and improved ATM transmission system by overcoming the limitations and disadvantages of a prior ATM transmission system.

It is also an object of the present invention to provide an ATM transmission system which suppresses useless traffic.

The above and other objects are attained by an ATM transmission system comprising a transmitting station, a receiving station, a communication channel between said stations for transmitting an ATM cell, data communication with a protocol data unit (PDU) having a packet and a header being carried out by using an ATM adaptation layer (AAL) which can recognize an end of packet cell (EOP cell) in a PDU by referring to a header in said EOP cell, and a plurality of ATM cells which form said protocol data unit being continuously applied to said transmitting station; wherein said receiving station comprises; an error detection means for detection whether an ATM cell is received correctly or incorrectly or lost; a cell arrival informing means for informing the transmitting station the result of said detection; said transmitting station comprises; a transmit buffer for temporarily storing an ATM cell to be transmitted; a group handling means for handling a plurality of ATM cells which form a protocol data unit in a common convergence sublayer as one group; a receiving means of a said cell arrival information whether the ATM cell has been received correctly or incorrectly or lost from an associated receiving station; a group data discard means for discarding all the ATM cells belonging to the group which includes an incorrectly received or lost ATM cell stored in said transmit buffer, when said receiving means receives the information of an incorrectly received or lost ATM cell; an end of packet cell (EOP cell) transmitting means for transmitting an EOP cell which has a flag in a payload type field in an ATM cell header, said flag indicating that the EOP cell is a final cell in the protocol data unit of the group, when said group data discard means discards the ATM cell in said transmit buffer; an ATM cell discard means for discarding an ATM cell which belongs to the discarded group, and arrives after discard.

Preferably, said transmitting station further comprises means for attaching sequence number to each ATM cell to be transmitted, and said error detection means in said receiving station detects whether a cell is received or lost by checking a sequence number of a received ATM cell.

Preferably, a communication channel between a transmitting station and a receiving station includes a plurality of virtual channels; each virtual channel transmits ATM cells having different virtual path identifier and different virtual channel identifier; a transmitting station and a receiving station establish a logical transmission link for each virtual channel of an ATM layer; and said group handling means handles transmission and reception of an ATM cell for each established logical transmission link independently.

Preferably, a communication channel between a transmitting station and a receiving station includes a plurality of virtual channels; each virtual channel transmits ATM cells having different virtual path identifier and different virtual channel identifier; said receiving station comprises a sequence number informing means for informing sequence number of an ATM cell which is lost or wrongly received, to said transmitting station; said transmitting station comprises a table having relations between sequence number of an ATM cell and a group which said ATM cell belongs, and a group identify means for identifying a group which a wrongly received or lost ATM cell belongs, according to a sequence number informed by said receiving means and content of said table.

According to the present invention, in case there is one virtual channel, or a plurality of virtual channels, on a circuit, when an ATM cell which is a part of a protocol data unit (PDU) is consecutively applied to a transmitting station, the transmitting station decides an ATM cell which would be useless, and discards the same.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The embodiments are exampled in case a transmission line is a wireless transmission line. Of course, it should be noted that the present invention is applicable not only to a wireless transmission line but also any other transmission line.

First Embodiment

First embodiment of the present invention is described in accordance with FIGS. 1–5.

Figure 1:
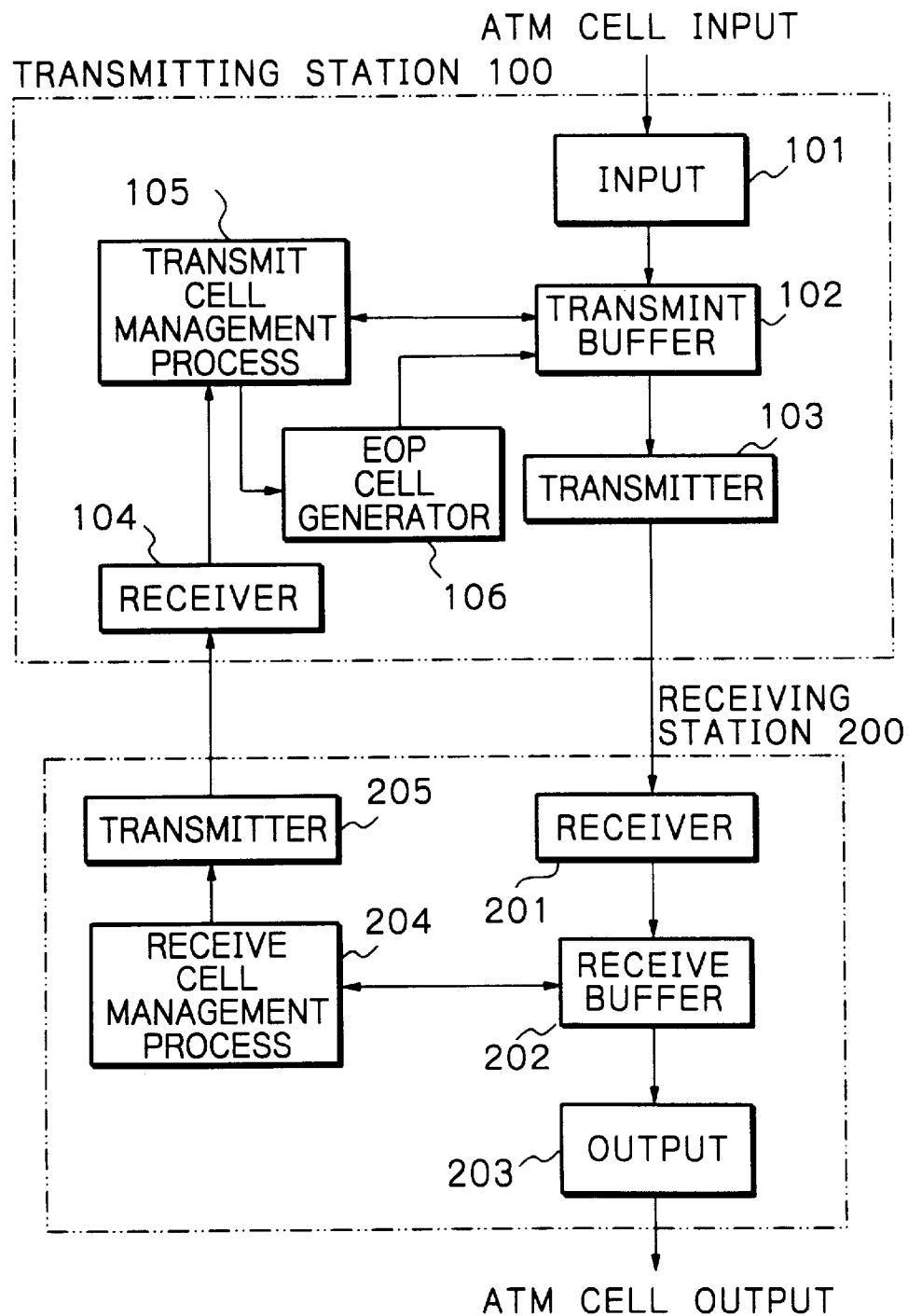
FIG. 1 is a block diagram of an ATM transmission system having a transmitting station 100 and a receiving station 200 installed in a base station 11 and a radio module 12.

FIG. 1 is a block diagram of a transmitting station 100 and a receiving station 200, installed in a base station 11 and a radio module 12, in a wireless ATM system.

Figure 2:
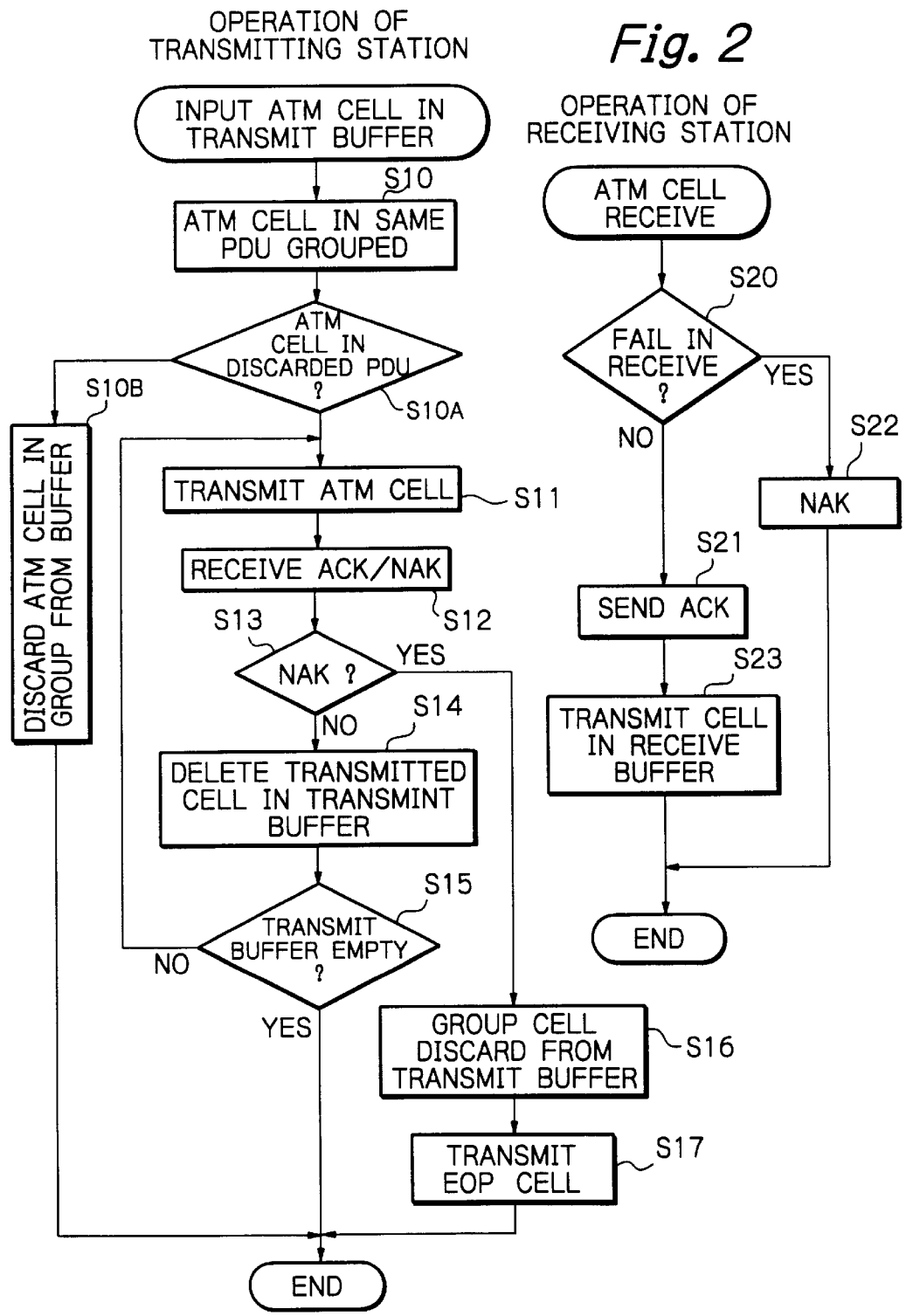
FIG. 2 is a flow chart showing the operation of a transmitting station 100 and a receiving station 200 in FIG. 1.
Figure 3:
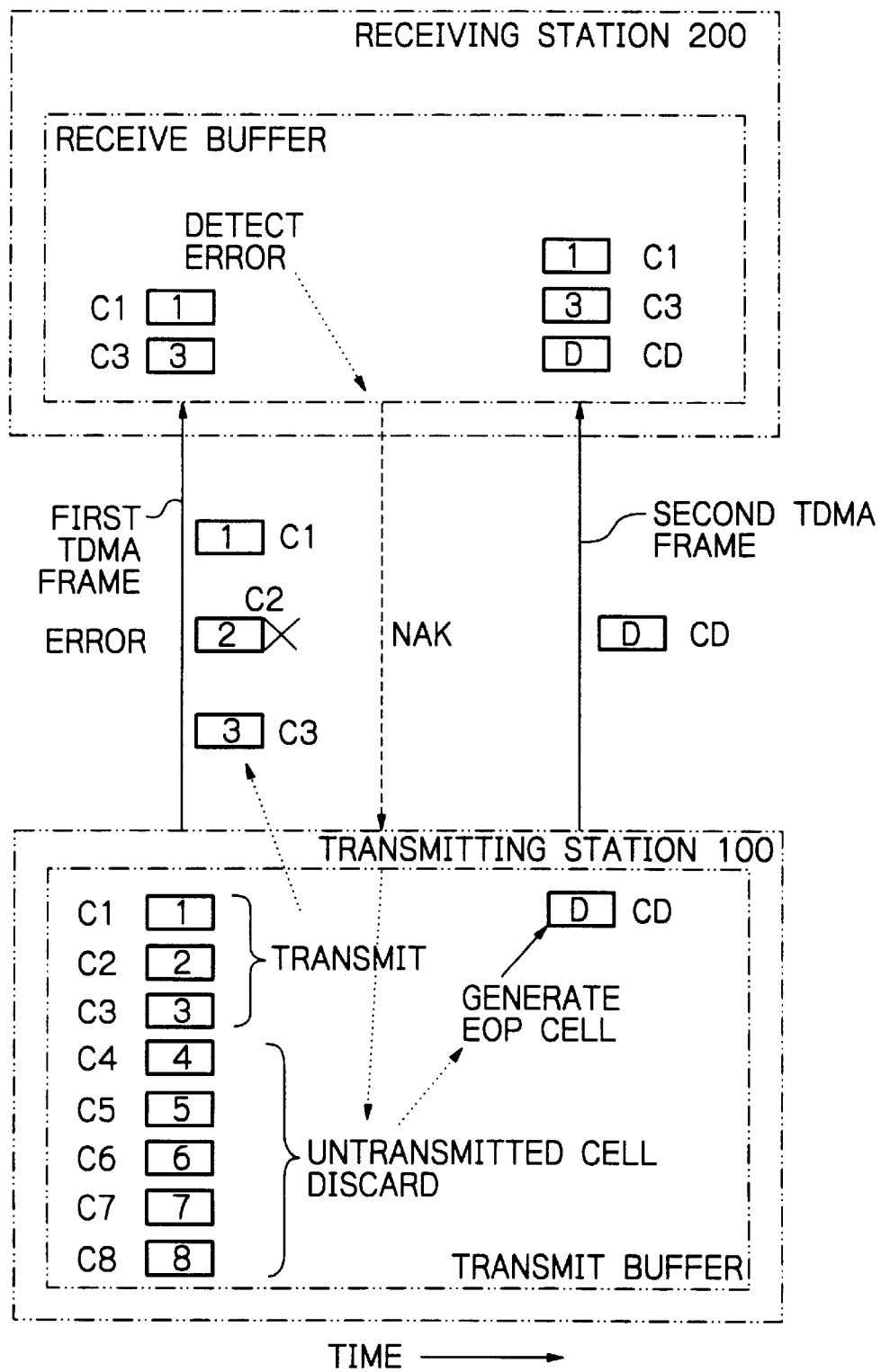
FIG. 3 shows sequence of transmission of an ATM cell between a transmitting station 100 and a receiving station 200.
Figure 4:
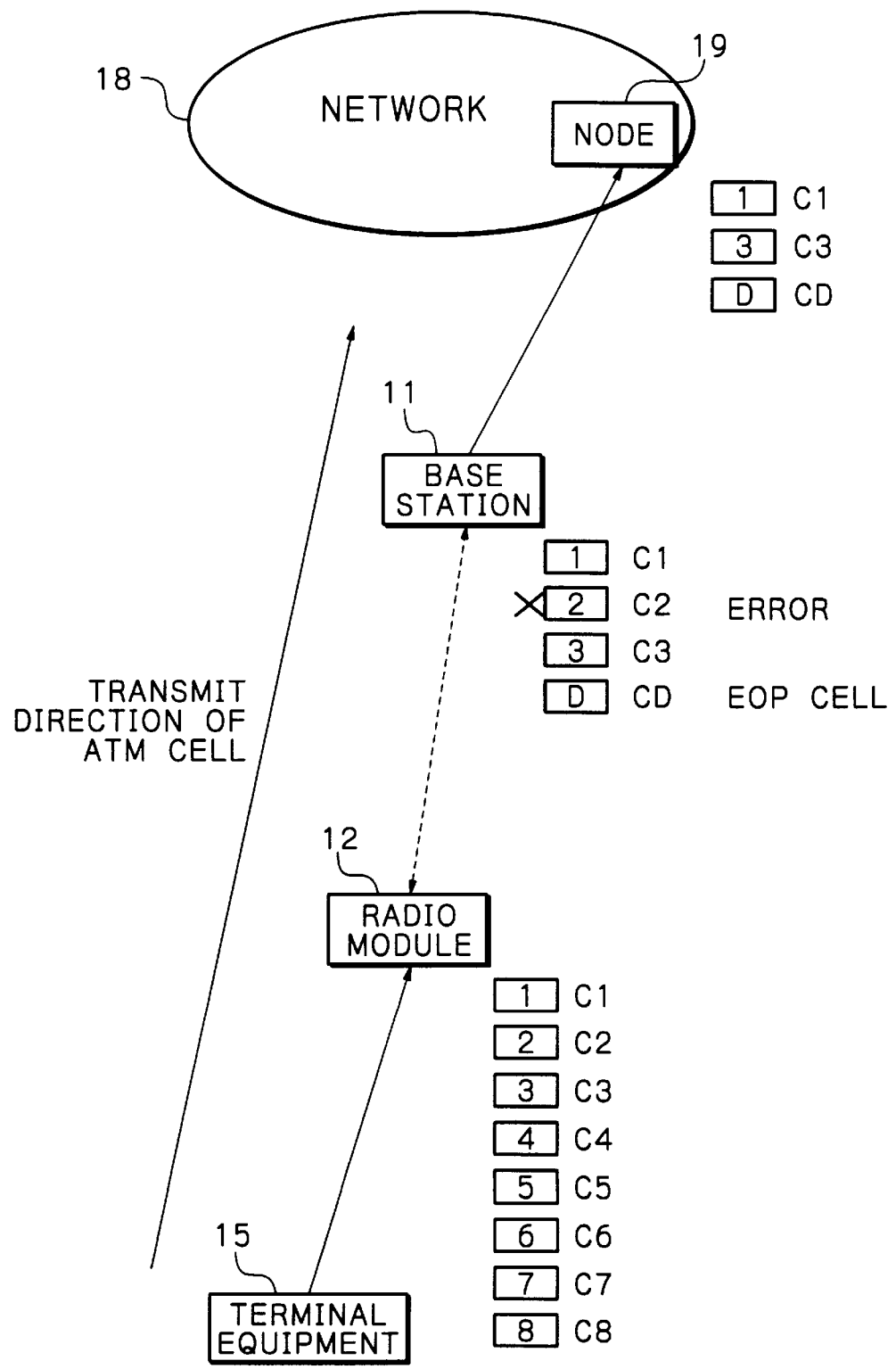
FIG. 4 shows a flow of an ATM cell from a terminal 15 to a node 19 in a wireless ATM transmission system.
Figure 5:
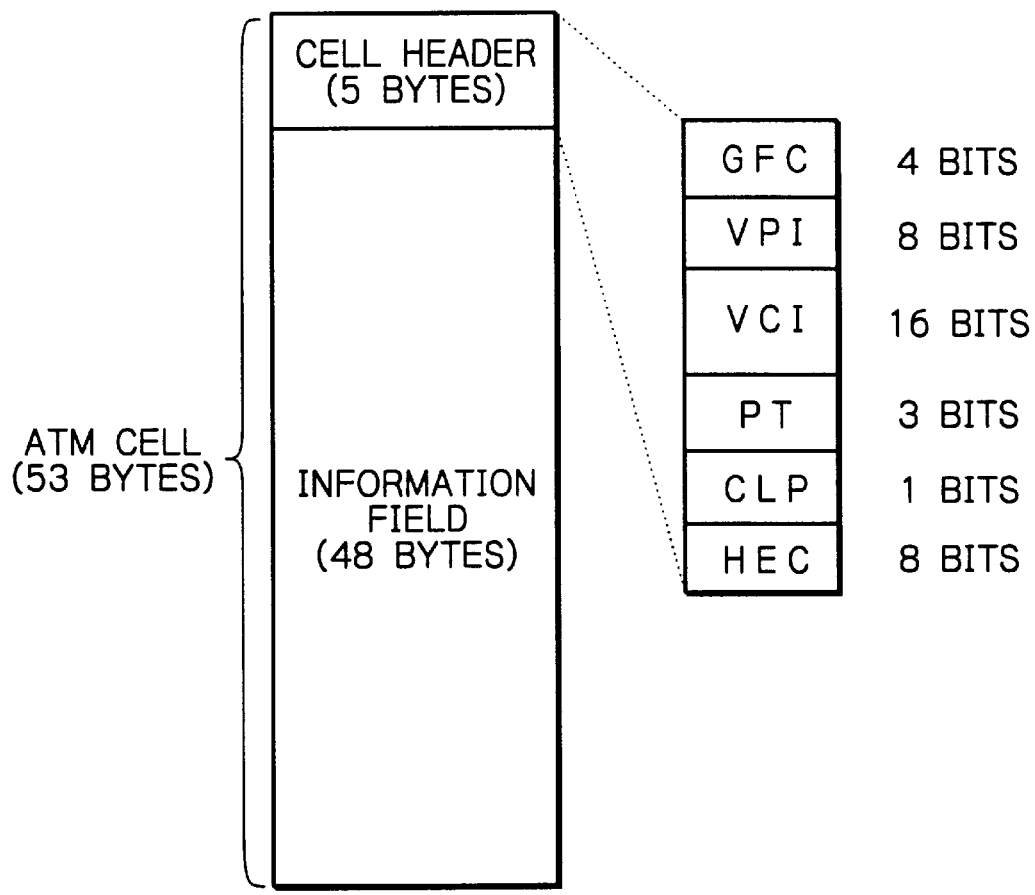
FIG. 5 shows a format of an ATM cell.

FIG. 2 shows an operational flow of the transmitting station 100 and the receiving station 200 in FIG. 1. FIG. 3 shows the sequence of transmission of an ATM cell in a transmitting station 100 and a receiving station 200. FIG. 4 shows a flow of an ATM cell from a terminal 15 to a node 19 in the present ATM system. FIG. 5 shows a format of an ATM cell.

As shown in FIG. 4, the wireless ATM system according to the present invention comprises a base station 11, a radio module 12, a terminal 15, a network 18 and a node 19. In order to establish a wireless link between a base station 11 and a radio module 12, each of the base station 11 and the radio module 12 has a transmitting station 100 and a receiving station 200.

In FIG. 1, the transmitting station 100 comprises an input means 101, a transmit buffer 102, a transmitter 103, receiver 104, a transmit cell management process 105, and a EOP cell (an End Of Packet cell) generator 106. The receiving station 200 comprises a receiver 201, a receive buffer 202, an output means 203, a receive cell management process 204, and a transmitter 205.

An ATM cell applied to the transmitting station 100 is stored temporarily in the transmit buffer 102 through the input means 101. The ATM cell stored in the transmit buffer 102 is read out sequentially when requested, and is transmitted from the transmitter 103 towards the receiving station 200 through a wireless link. In an actual embodiment, a slot in a TDMA frame is used to carry one or a plurality of ATM cells.

An ATM cell received by the receiving station 200 in a base station 11 is temporarily stored in a receive buffer 202, then, it is read out when requested, and is forwarded to a node 19 through an output means 203.

It is assumed that a type 5 of an ATM adaptation layer (AAL) is used to transmit a packet data, in the present wireless ATM transmission system. In the type 5 of the ATM adaptation layer, a data is processed by each protocol data unit (PDU), which has a packet data and a packet header.

It is further assumed that size of a unit packet (PDU) processed in a higher layer is larger than size of an ATM cell.

In this case, each packet is transmitted after segmented into a plurality of ATM cells. Therefore, a plurality of ATM cells are applied to the transmitting station 100 sequentially.

It is one of the features of the present invention that when a plurality of ATM cells are applied to the transmitting station 100, the transmitting station detects useless ATM cell and discards the same.

In a type 5 of an ATM adaptation layer (AAL), the transmitting station 100 refers to a field of payload type (PT) and a field of virtual path identifier (VPI) and a virtual channel identifier (VCI) in an ATM cell header, and handles a packet having a plurality of ATM cells which consist a common part convergence sub-layer protocol data unit (CPCS-PDU) (see FIG. 5).

Therefore, the transmitting station 100 treats a plurality of ATM cells to as a group, and processes ATM cells by each packet (or group) which belongs to a higher layer, however, the higher layer is not terminated, in other words, an ATM cell is transmitted only through an ATM layer but not a higher layer. This means in a logical link (VPI, VCI) that a payload type (PT) field is used to detect an ATM cell located at a border of a packet or common part convergence sublayer protocal data unit (CPCS-PDU) in a type 5 of ATM adaptation layer (AAL).

In FIG. 1, the receive cell management process 204 in the receiving station 200 detects whether an ATM cell from the transmitting station 100 is successfully received or not. When it is successful, the receive cell management process 204 forwards a positive response ACK which shows the successful reception to the transmitting station 100 through a transmitter 205. When it is failed, the receive cell management process 204 forwards a negative response NAK which shows the fail to the transmitting station 100 through a transmitter 205.

The receiver 104 in the transmitting station 100 receives a response ACK or NAK which the transmitter 205 in the receiving station 200 forwards, and is transferred to a transmit cell management process 105.

The transmit cell management process 105 refers to a field of payload type (PT) and a field of virtual path identifier and a virtual channel identifier (VPI, VCI) in an ATM cell header, and handles a plurality of ATM cells which consist a packet (CPCS-PDU) as a group.

When the transmit cell process 105 detects a failed ATM cell by the NAK from the receiver 104, all the ATM cells in the group (including untransmitted CPCS-PDU) including the failed ATM cell are discarded from the transmit buffer 102.

When the transmit cell management process 105 discards an ATM cell in the transmit buffer 102, an EOP (end of packet) cell generator 106 generates an EOP cell, which is transmitted to the receiving station 200 through the transmit buffer 102 and the transmitter 103.

An EOP cell generated by the EOP cell generator 106 has the same identifiers (VPI, VCI) of a virtual link as that of the discarded ATM cell, and a bit (SDU type) is set to 1 (one) in a payload type (PT) field, in order to indicate that the EOP cell is the border or the final ATM cell in the packet.

A destination terminal equipment of the packet can recognize that all the ATM cells in a packet (CPCS-PDU) has completed, upon receipt of an EOP cell.

FIG. 2 shows the operational flow of the transmitting station 100 and the receiving station 200.

The transmit cell management process 105 in the transmitting station 100 groups (S10) a plurality of ATM cells of a packet (CPCS-PDU) by referring each fields (PT, VCI, VPI) in an ATM cell header, upon receipt of an ATM cell into the transmit buffer 102 through the terminal 15 or node 18.

If an ATM cell belongs to a group which has been discarded (S10A), the ATM cells which belong to the discarded group are discarded (S10B).

When an ATM cell does not belong to a group which has been discarded, the transmitting station 100 transmits an ATM cell by a TDMA frame according to an assigned radio resource to the receiving station 200 (S11).

Then, the transmitting station 100 receives the response ACK or NAK for the transmitted ATM cells from the receiving station 200 through a control wireless channel (S12).

When no NAK is received, that is to say, when the transmission of an ATM cell is successful, the transmit cell management process 105 deletes transmitted ATM cells in the transmit buffer 102 (S14). Alternatively, the transmit cell management process 105 may delete a transmitted ATM cell in the transmit buffer 102 immediately when an ATM cell has been transmitted, with no reception of response (ACK or NAK).

When there is an untransmitted ATM cell in the transmit buffer 102, the control returns to the step S11 so that the transmission of ATM cell is continued. When all the ATM cells in the transmit buffer 102 are transmitted, the transmit process finishes.

When the transmitting station 100 receives the negative response NAK for a transmitted ATM cell from the receiving station 200, the control proceeds to the step S16, and the transmit cell management process 105 discards all the ATM cells belonging to the group including the failed ATM cell in the transmit buffer.

In the step S17, an EOP cell generated by the EOP cell generator 106 is transmitted to the receiving station 200. The EOP cell itself is an ATM cell, which has one bit (SDU type) set to 1 in a PT field in a cell header.

When the receiving station 200 receives an ATM cell, the receive cell management process 204 checks whether it is successful or in fail (S20). When it is successful, the positive response ACK is sent to the transmitting station (S21), and when it is failure, the negative response NAK is sent to the transmitting station (S22).

An ATM cell which is received successfully is forwarded to a node 19 or a terminal 15 (S23).

FIG. 3 shows an operation of transmission of an ATM cell from the transmitting station 100 to the receiving station 200 through a wireless section. It is supposed that a wireless information channel is provided between the transmitting station 100 and the receiving station 200, and a wireless control channel is also provided for transmission of the result of the user information.

In FIG. 3, it is assumed that each TDMA frame can transmit three ATM cells, for the sake of simplicity of explanation. It is also assumed that each packet (PDU) has 8 ATM cells C1 through C8, and the second ATM cell C2 is erroneous in a wireless link. In FIG. 3, the change of the situation is shown in the horizontal direction from left to right.

An ATM cell which is to be transmitted from the transmitting station 100 to the receiving station 200 is kept in a transmit buffer. In the embodiment, 8 ATM cells C1 through C8 are kept in the transmit buffer 102.

First, three ATM cells C1 through C3 among 8 cells C1 through C8 are transmitted in the first TDMA frame.

After the transmission of three cells C1 through C3, 5 cells C4 through C8 are kept in the transmit buffer 102.

When the second ATM cell C2 is erroneous in a wireless link in the first TDMA frame, the receiving station 200 detects the error, and sends the negative response NAK to the transmitting station 100.

The transmitting station 100 recognizes the error upon receipt of the response NAK from the receiving station 200. Then, the transmitting station 100 discards the ATM cells C4 through C8 kept in the transmit buffer 102 as a useless cell.

Further, the transmitting station 100 generates an EOP cell CD, which is transmitted to the receiving station 200 in the next TDMA frame.

The EOP cell CD is an ATM cell which informs a destination receiver an end of a packet (PDU). It is supposed that a EOP cell CD has a bit (SDU type) set to 1 (one) in a PT field in a cell header.

As a result, the destination receiver receives two ATM cells C1 and C3, and an EOP cell CD in a packet (PDU).

It should be noted that a packet which includes a wrong ATM cell has less ATM cells in the present invention than a number of initially transmitted ATM cells. Therefore, the traffic is decreased according to the present invention as compared with the case that all the ATM cells C1 through C8 were transmitted.

FIG. 4 shows a flow of an ATM cell when a packet (PDU) having 8 ATM cells (C1 through C8) is transmitted from the terminal 15 to the node 19. In FIG. 4, an ATM cell is transmitted by using a transmitting station 100 installed in a radio module (RM) 12 and a receiving station 200 installed in a base station 11.

When the second ATM cell C2 is in error in wireless link between a radio module 12 and a base station 11, as is the case of FIG. 3, the radio module 12 transmits an EOP cell CD after three ATM cells C1 through C3 are transmitted to the base station 11.

Accordingly, the base station 11 transfers the received ATM cells C1, C3 and an EOP cell CD to a node 19 of a network 18.

Figure 13:
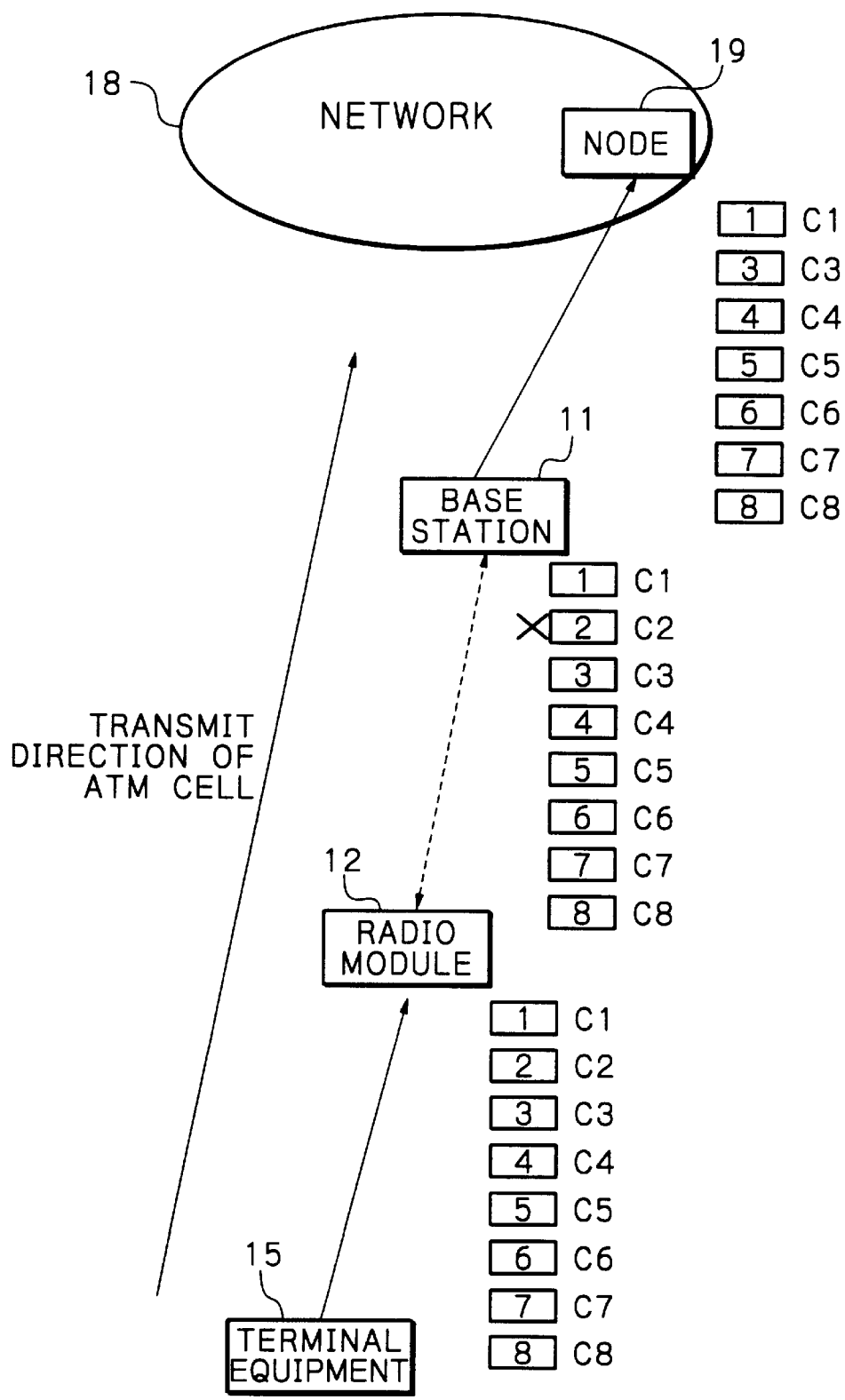
FIG. 13 shows an example of transmission of ATM cells.
Figure 14:
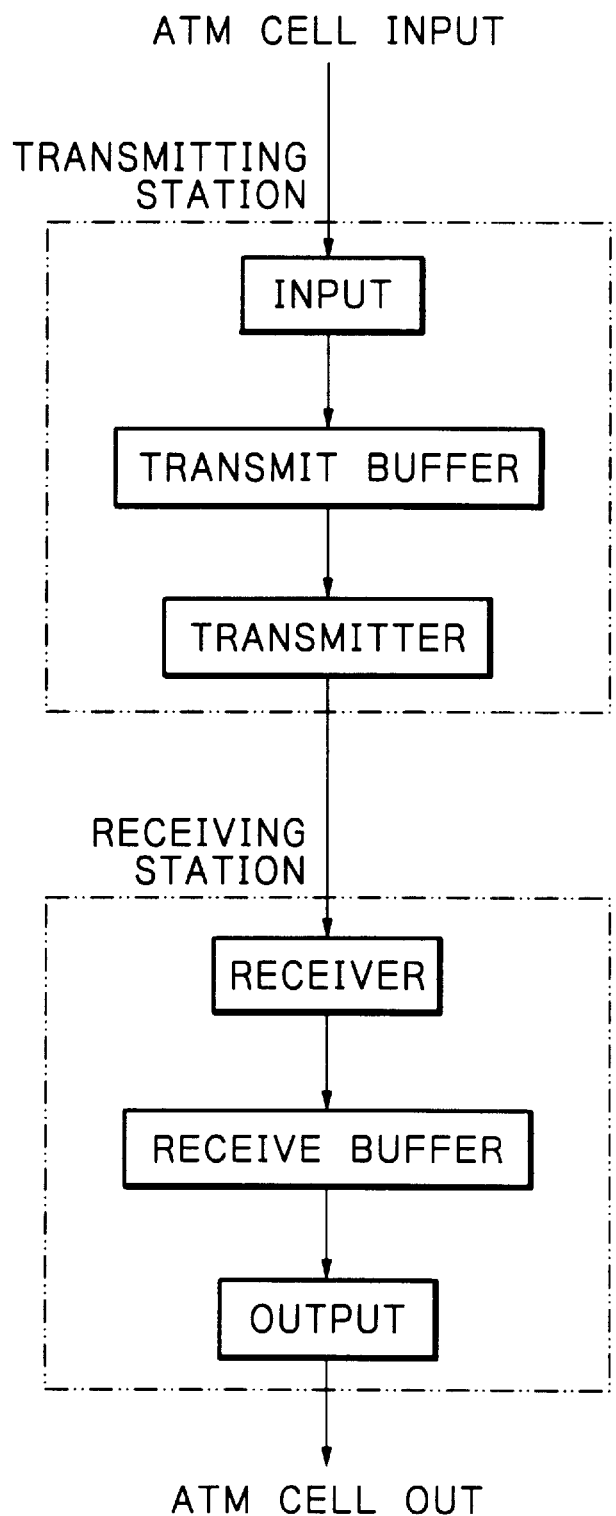
FIG. 14 is a block diagram of a prior ATM transmission system.
Figure 15:
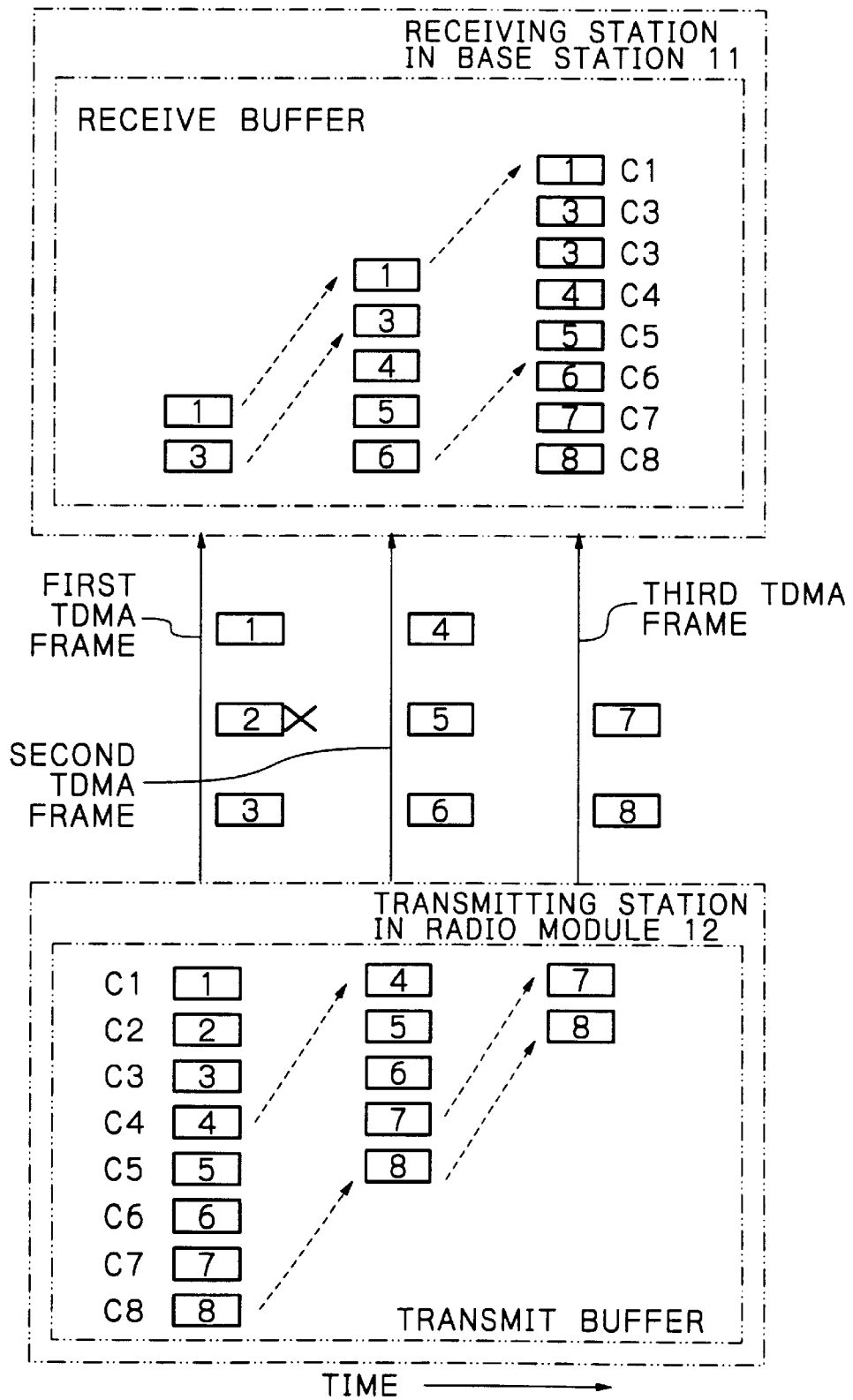
FIG. 15 shows an example of transmission of ATM cells in a prior art.

Comparing FIG. 4 with FIG. 13 which belongs to a prior art, it should be appreciated that only three ATM cells C1, C3 and CD are sent to a node 19 in FIG. 4 (present invention), while seven ATM cells (C1, C3, C4, C5, C6, C7 and C8) are sent to a node 19 in FIG. 13 (prior art), and that those ATM cells sent to a node 19 are discarded because of lack of C2. The present invention has the advantage that less number of ATM cells are forwarded when an ATM cell in a packet is in error, and thus, the traffic in a communication line is decreased.

The above embodiment is directed that an EOP cell is newly generated after all the cells in a packet are discarded. As a modification, as a packet has inherently an EOP cell which has a bit (SDU type) set to 1 in a PT field, at the end of the packet, it is possible to discard all the cells except the EOP cell in a packet, but no new EOP cell is generated.

Second Embodiment

Figure 6:
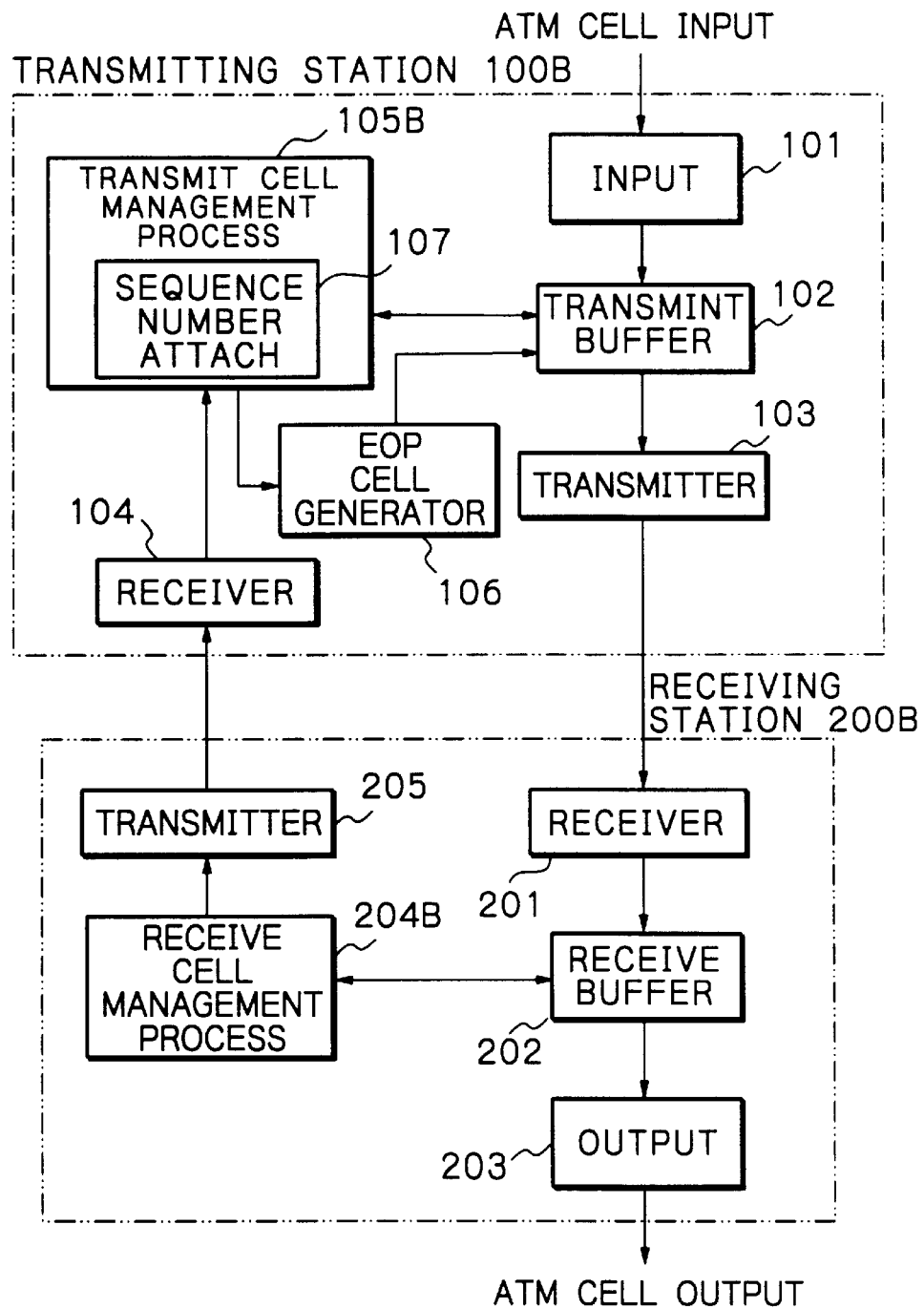
FIG. 6 is a block diagram of an ATM transmission system in another embodiment.

FIG. 6 shows a block diagram of another embodiment of the present ATM transmission system. In FIG. 6, the same numerals as those of FIG. 1 show the same members, and the same operation as that of FIG. 1 is omitted in the following description.

The feature of the embodiment of FIG. 6 is that a receiving station 200B can detect an error of reception even when an ATM cell is lost in a link between a transmitting station 100B and a receiving station 200B.

As shown in FIG. 6, a transmit cell process 105B in the transmitting station 100B has a sequence number attach 107, which attaches an ATM cell in a transmit buffer 102 a sequence number so that a specific ATM cell is identified.

An ATM cell assigned a sequence number is transmitted to a wireless link through a transmitter 103.

In a receiving station 200B, an ATM cell thus received is applied to a receive buffer 202 through a receiver 201. This ATM cell is applied to a receive cell process 204B which confirms the safe receipt of the ATM cell, and then, the ATM cell is provided to an external circuit through an output means 203.

It should be appreciated that the receive cell process 204B detects not only an error of an ATM cell but also a loss of the same in a wireless link.

An ATM cell applied to the receive cell process 204B includes an information of sequence number of an ATM cell, therefore, the receive cell process 204B can confirm the loss of an ATM cell based upon the sequence of the sequence number.

For instance, in FIG. 4, assuming that the ATM cells C1 through C8 have sequence numbers 0001, 0002, 0003, 0004, 0005, 0006, 0007, and 0008, respectively, then, an ATM cell received in the receive cell process 204B in a base station 11 has the sequence number 0001, 0002, 0003 et al in normal condition.

On the other hand, if the second ATM cell is lost, the third ATM cell having the sequence number 0003 is detected after the first ATM cell having the sequence number 0001. Thus, the receive cell process 204B confirms the loss of an ATM cell according to the sequence of the sequence numbers of ATM cells reached the receive cell process 200B.

The receive cell management process 204B, upon detection of the loss or the error, transmits the response NAK which indicates the loss or the error to the transmitting station 100B through the transmitter 205.

As is the case of the first embodiment of FIG. 1, the transmit cell management process 105B in the transmitting station 100B refers to the fields PT, VCI and VPI in the cell header of an ATM cell, handles a plurality of cells which form a packet (CPCS-PDU) as one group.

Upon recognition of the failure of an ATM cell by the negative response NAK from the receiving station 200B, all the ATM cells belonging to the group which includes the failed cell are discarded in the transmit buffer 102.

Then, an EOP cell generated in the EOP cell generator 106 is transmitted through the transmit buffer 102 and the transmitter 103. The cell header of the EOP cell has the same information in the fields VPI and VCI in the cell header as those of the discarded ATM cell. The bit SDU type in the field PT of the EOP cell is set to 1 (one).

Third Embodiment

Figure 7:
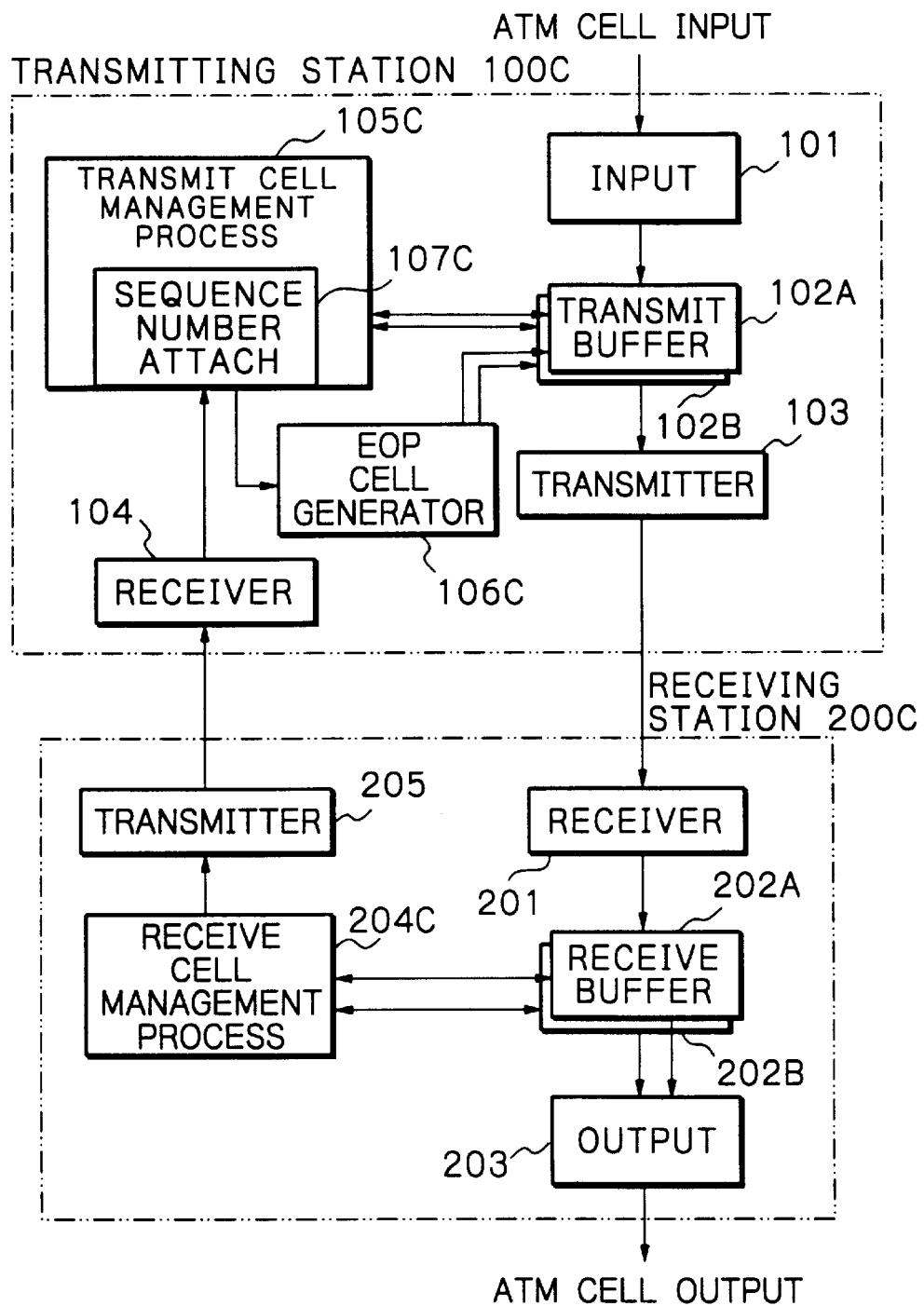
FIG. 7 is a block diagram of an ATM transmission system in still another embodiment.

FIG. 7 shows a block diagram of still another embodiment of the present wireless transmission system. The same numerals as those of the previous embodiments show the same members. The operation of FIG. 7 which is not described is the same as that of the previous embodiments.

Figure 9:
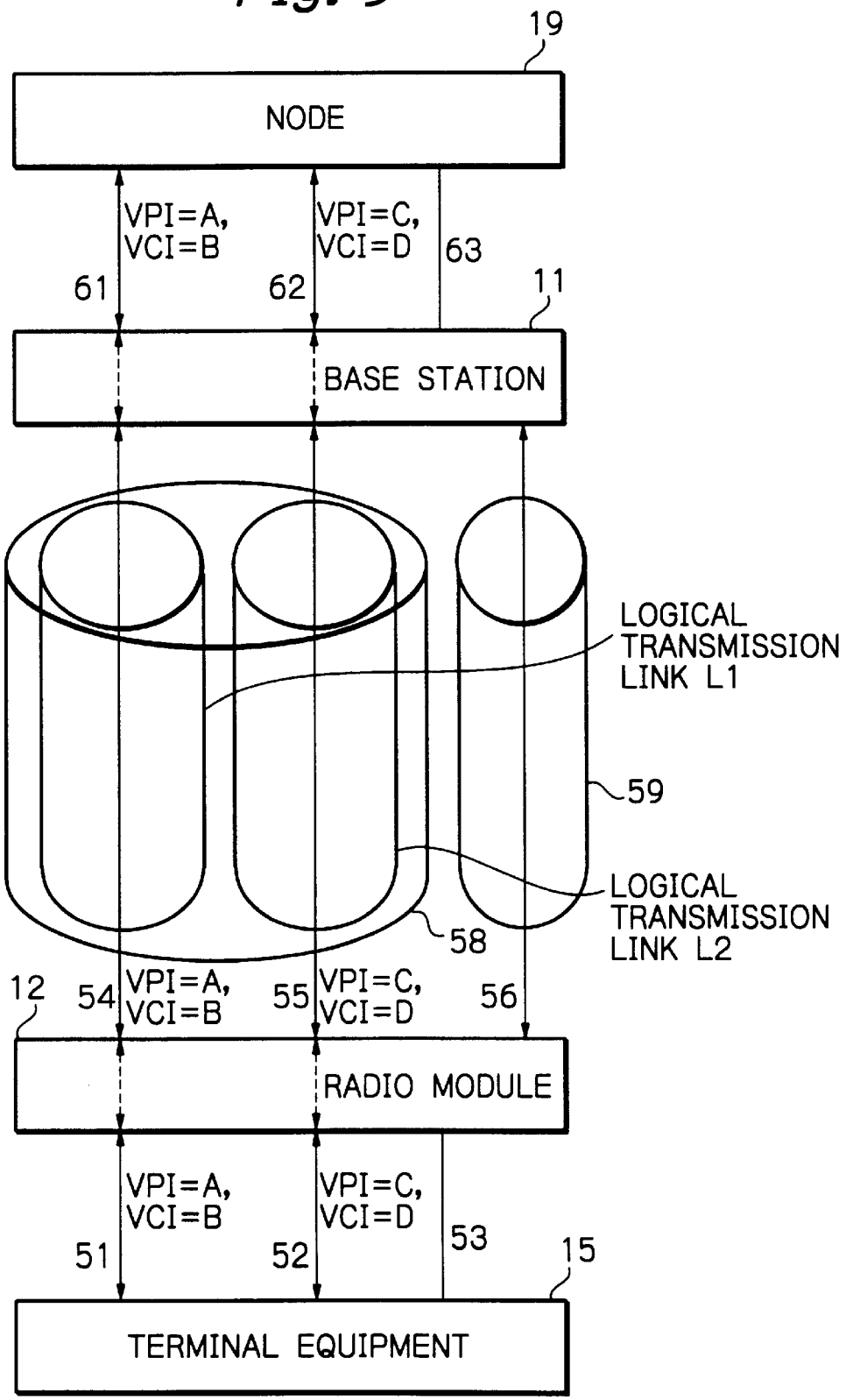
FIG. 9 shows structure of a logical link when a plurality of virtual channels exist.

It is assumed in FIG. 7 that a plurality of virtual channels are provided between a terminal 15 and a node 19 as shown in FIG. 9. In this case, ATM cells having different virtual channels (VPI/VCI) exist simultaneously in a wireless link.

In this case, logical transmission links L1, L2 are assumed for each virtual channels between the transmitting station 100C and the receiving station 200C, and the transmission and/or the reception of an ATM cell is processed for each logical transmission links L1 and L2. Thus, even when ATM cells having the different virtual channels (VPI/VCI) exist, the transmitting station 100C can discard a useless ATM cell.

In FIG. 9, a wired link 53 is provided between a terminal 15 and a radio module 12. A radio module 12 and a base station 11 are coupled by a wireless user link 58 and wireless control link 59. Further, a base station 11 is coupled with a node 19 by a wired link 63.

It is assumed that two virtual channels 51 and 52 are provided between the terminal 15 and the radio module 12, two virtual channels 54 and 55, and a control link 56 are provided between the radio module 12 and the base station 11, and two virtual channels 61 and 62 are provided between the base station 11 and the node 19.

In the virtual channels 51, 54 and 61, the virtual path identifier VPI is "A" and the virtual channel identifier VCI is "B", and in the virtual channels 52, 55 and 62, the virtual path identifier VPI is "C", and the virtual channel identifier VCI is "D".

It should be noted that a radio module 12 and a base station 11 do not terminate a virtual channel (VP/VC). It is a design matter of an actual system where a virtual channel is terminated. A radio module 12 and/or a base station 11 can change an identifier (VPI/VCI).

As shown in FIG. 9, between a radio module 12 and a base station 11, a wireless user link 58 and a wireless control link 59 for control link 56 are provided.

The response whether an ATM cell reached correctly or not, from the receiving station 200C to the transmitting station 100C is transmitted through the control link 56. Two pairs of virtual channels 51-54-61, and 52-55-62 are provided between the terminal 15 and the node 19.

In this embodiment, two kinds of ATM cells, one having a virtual path identifier (VPI) "A" and a virtual channel identifier (VCI) "B", and the other having a virtual path identifier (VPI) "C" and a virtual channel identifier (VCI) "D" exist simultaneously in wired links 53 and 63 and the wireless user link 58.

It is assumed that an ATM cell is transmitted from a terminal 15 to a node 19, in other words, a radio module is a transmitting station and a base station is a receiving station.

When an ATM cell which forms a packet is transmitted to a radio module 12 from a terminal 15, the ATM cell is stored temporarily in a transmit buffer in the radio module 12. The radio module 12 handles an ATM cell for each virtual channel, and establishes logical transmission links L1 and L2 in a user wireless link 58 for each virtual channel between the radio module and the base station 11.

The base station 11 also handles a receive ATM cell for each virtual channel. The assignment of sequence number to an ATM cell in a radio module, the response or confirmation of receipt of an ATM cell by a base station, are carried out for each logical wireless links L1 and L2, independently.

As described above, even when a plurality of virtual links exist in a wireless circuit, a logical transmission link (L1, L2) is established for each virtual channel between a radio module and a base station, and a sequence number is processed in each logical transmission link, independently. Thus, it is possible to discard a useless ATM cell.

FIG. 7 shows a transmitting station 100C and a receiving station 200C when two virtual channels exist, and it should be noted that a transmitting station 100C has two transmit buffers 102A and 102B.

An ATM cell applied to the transmitting station 100C is stored either in a transmit buffer 102a or in a transmit buffer 102B for each virtual channel through an input means 101. A pair of transmit buffers 102A and 102B may be implemented either by a single physical memory which is divided into a plurality of partial areas, or by a plurality of physical memories. Receive buffers 202A and 202B may be implemented similarly.

The transmit cell management process 105C refers to the fields PT, VCI and VPI in an ATM cell header, and processes a plurality of ATM cells which form a packet (CPCS-PDU) as one group.

The sequence number attach 107C assigns sequence number for confirmation of arrival, and logical wireless link identifier which shows logical wireless link to each ATM cell, for every logical wireless link.

An ATM cell which is assigned sequence number and logical wireless link identifier is radiated into wireless space as a wireless ATM cell through a transmitter 103. The wireless ATM cell is received by the receiving station 200C.

The wireless ATM cell received by the receiving station 200C is applied either to a receiving buffer 202A or 202B for every virtual channel through a receiver 201.

The receive cell management process 204C in the receiving station 200C confirms the sequence number of an ATM cell for every logical wireless link, and forwards the positive response ACK for a successful ATM cell or the negative response NAK for a failed ATM cell through the transmitter 205.

The response ACK or NAK is assigned an information which logical wireless link it belongs by the receive cell process 204C.

The transmit cell management process 105C in the transmitting station 100C receives the response ACK/NAK and logical wireless link information transmitted by the transmitter 205 of the receiving station 200C, through the receiver 104.

The transmit cell management process 105C refers to the fields PT, VCI and VPI in the ATM cell header, and handles plurality of ATM cells which form one packet (CPCS-PDU) as one group.

When the transmit cell management process 105C detects a wrong ATM cell which fails in transmission, all the ATM cells in the group which includes the wrong ATM cell, are discarded in a transmit buffer 102A or 102B.

Then, an EOP cell generated by the EOP cell generator 106C is transmitted through the transmitter 103. The virtual path identifier VPI and the virtual channel identifier VCI of the EOP cell are the same as those of discarded ATM cells. The bit SDU of the field PT in the EOP cell is 1 (one).

Figure 10:
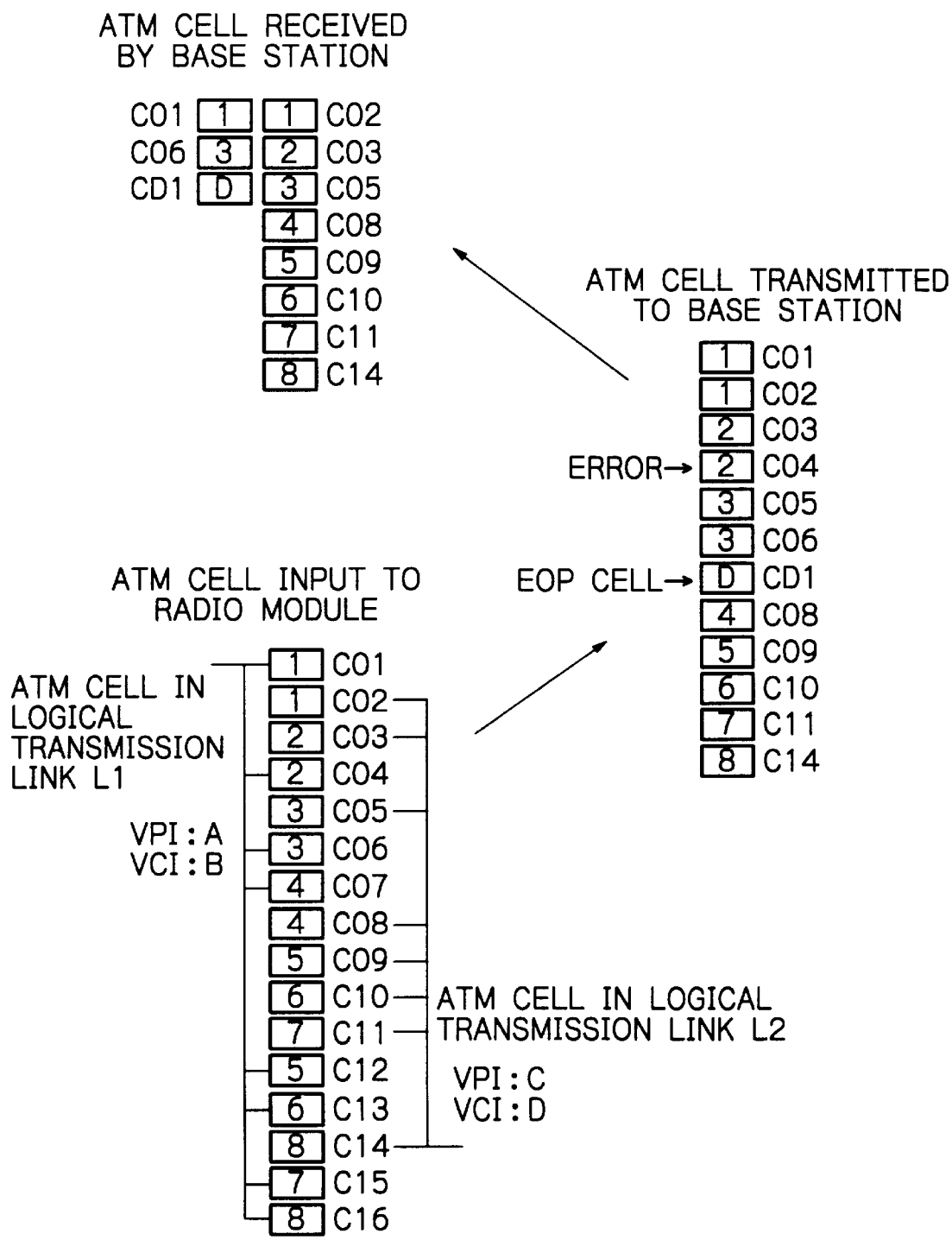
FIG. 10 shows a flow of ATM cells when ATM cells in a plurality of logical links are mixed and transmitted.
Figure 11:
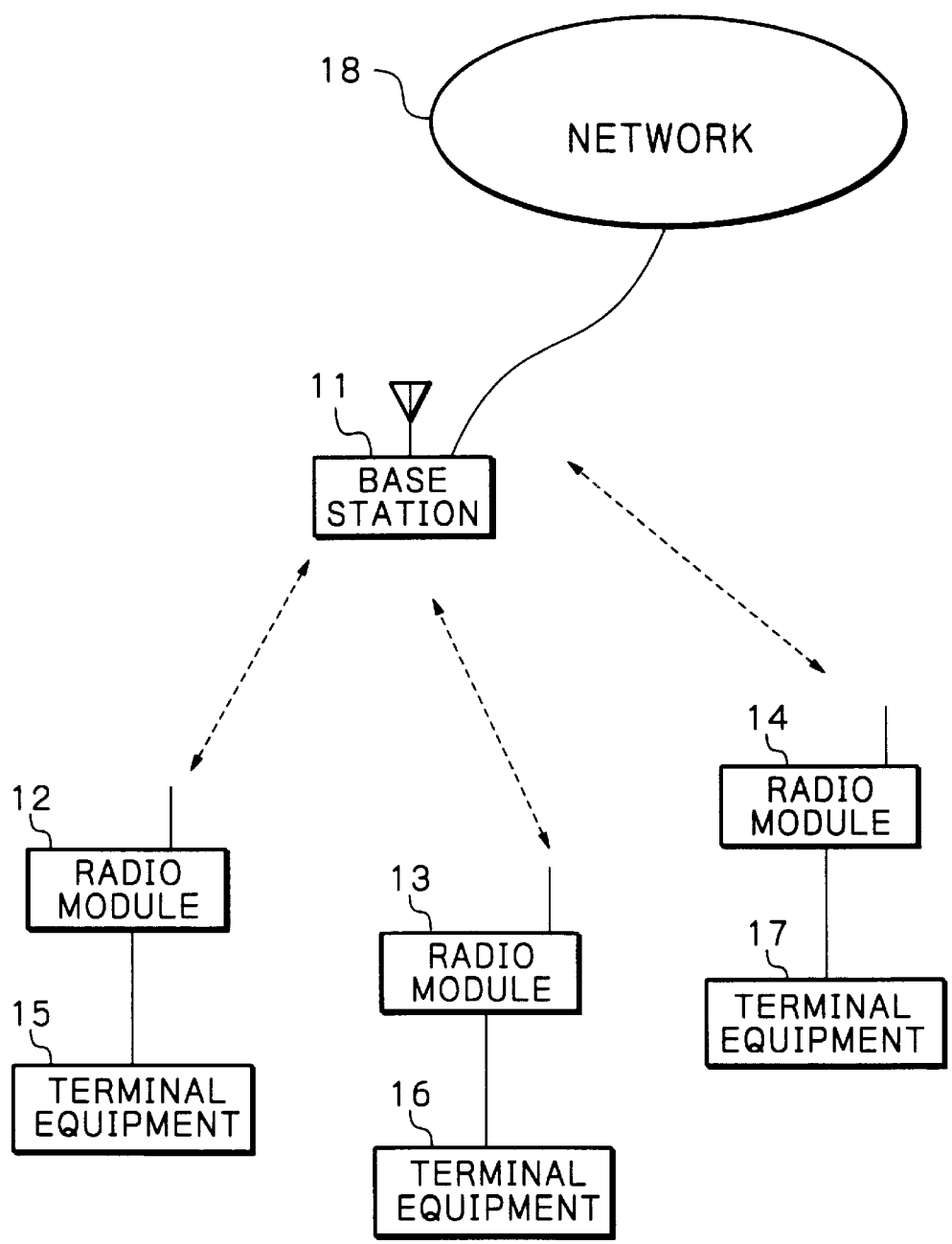
FIG. 11 is a block diagram of a wireless ATM system.
Figure 12:
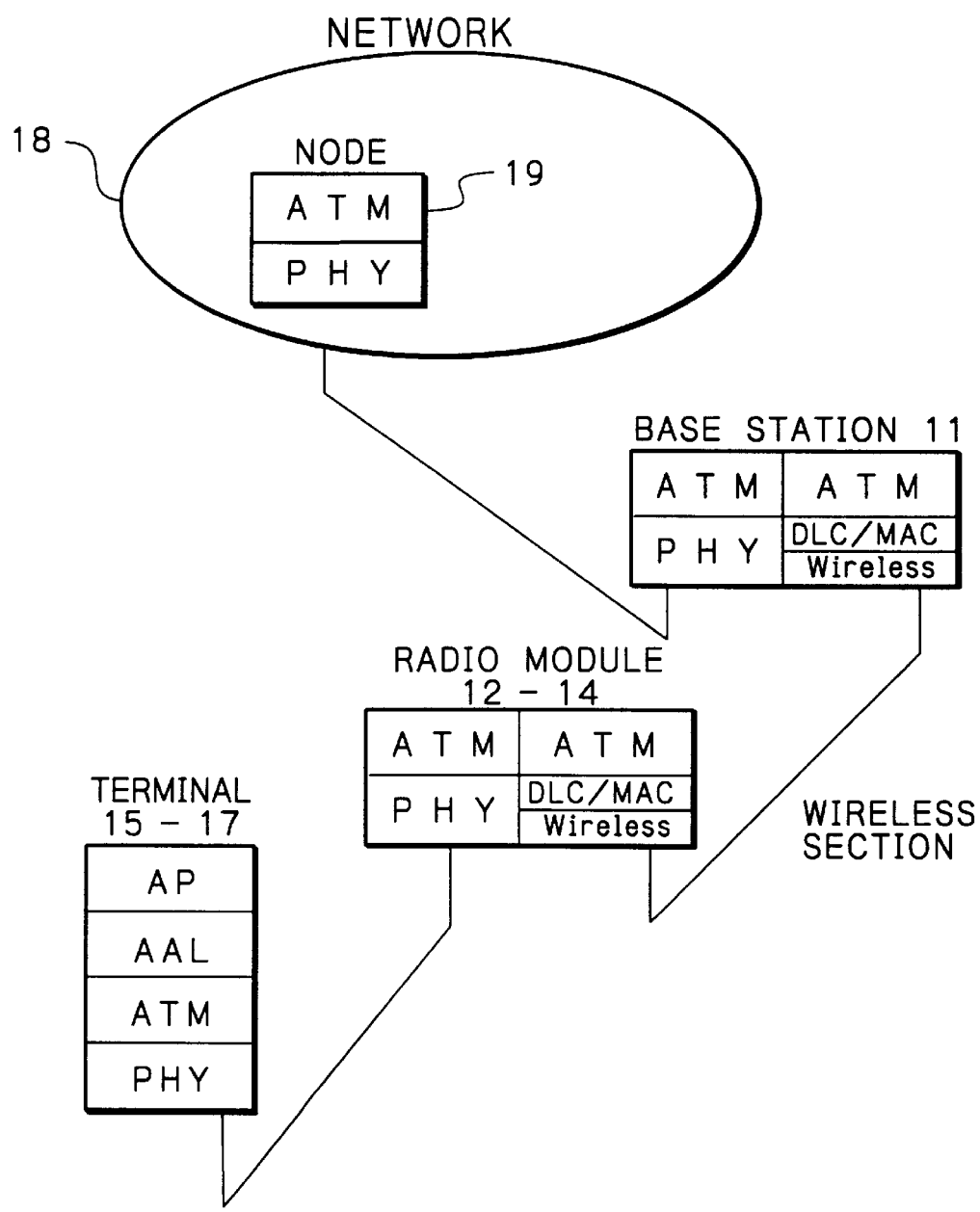
FIG. 12 shows a protocol stack in a wireless ATM system in FIG. 11.

FIG. 10 shows the flow of an ATM cell when ATM cells belonging to one of two virtual channels is transmitted. In FIG. 10, it is assumed that an ATM cell is transmitted from a radio module 12 to a base station 11. In FIG. 10, a first virtual channel relating to a logical wireless link L1 and a second virtual channel relating to a logical wireless link L2 exist.

It is assumed that 16 ATM cells C01–C16 are applied to the radio module 12, among them, 8 ATM cells C01, C04, C06, C07, C12, C13, C15 and C16 are transmitted through a first logical transmission link L1, and other 8 ATM cells C02, C03, C05, C08, C09, C10, C11 and C14 are transmitted through a second logical transmission link L2.

The 8 ATM cells C01, C04, C06, C07, C12, C13, C15 and C16 are obtained by segmenting a packet in an ATM adaptation layer (AAL) type 5. Also, other 8 ATM cells C02, C03, C05, C08, C09, C10, C11 and C14 are obtained by segmenting another packet.

In the wireless ATM transmission system in FIG. 7, the control of the confirmation of an ATM cell, et al is carried out for every logical transmission link, the ATM cells are transmitted as shown in FIG. 10.

If there were no error, the 16 ATM cells C01–C16 would be sequentially transmitted from the radio module to the base station. However, FIG. 10 shows that the second cell C04 among 8 cells C01, C04, C06, C07, C12, C13 C15 and C16 which are handled by the logical link L1 is in error.

If the error of the ATM cell C4 is recognized after the third ATM cell C06 is transmitted in the logical transmission link L1, the rest of the ATM cells C07, C12, C13, C15 and C16 in the logical wireless link L1 are discarded in the transmit buffer 102A, and instead, an EOP cell CD1 is transmitted.

Other 8 ATM cells C02, C03, C05, C08, C09, C10, C11 and C14 handled in the other logical transmission link L2 are correctly transmitted with no error, and therefore, all of those cells are transmitted to the base station 11.

Accordingly, it should be appreciated that when there are ATM cells belonging to different packets each of which is transmitted through an associated virtual channel (VPI/VCI), only untransmitted ATM cells belonging to a packet (group) having an ATM cell with an error are discarded.

Fourth Embodiment

Figure 8:
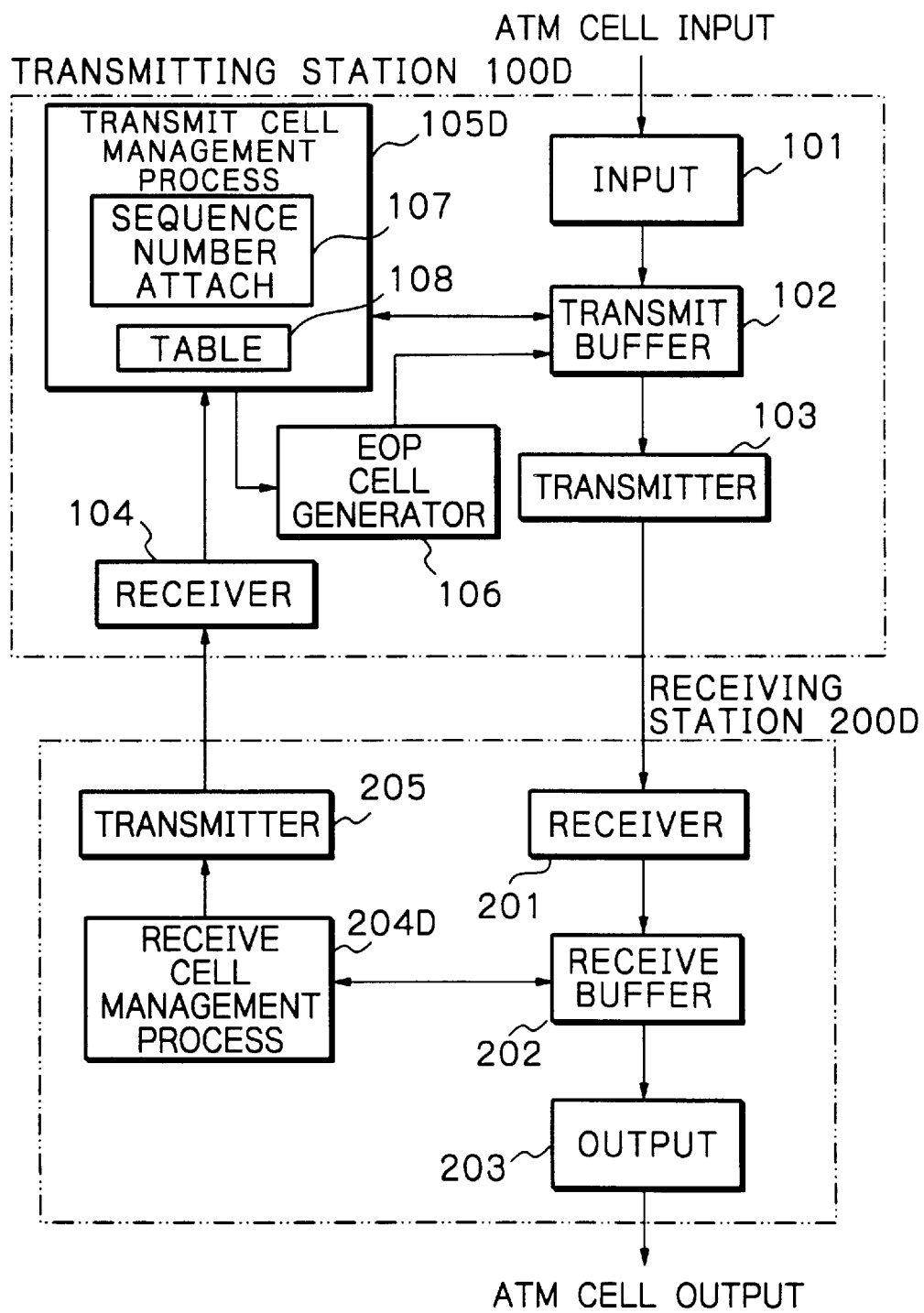
FIG. 8 is a block diagram of an ATM transmission system in still another embodiment.

FIG. 8 is a block diagram of still another embodiment of an ATM transmission system according to the present invention.

In FIG. 8, the same numerals as those in the previous embodiments show the same members, and the operation which is not described in FIG. 8 but described in accordance with the previous embodiments is the same as those of the previous embodiments.

It is assumed in FIG. 8 that a plurality of virtual channels are provided between a terminal 15 and a node 19, as is the case of the embodiment of FIG. 7. Therefore, a plurality of ATM cells having the different virtual path identifier VPI and the different virtual channel identifier VCI exist in a wireless channel.

In FIG. 8, a table 108 is provided in a transmit cell management process 105D. The table 108 keeps the relations between a sequence number for confirmation of correct arrival of an ATM cell, and a group (packet(PDU)) which includes the ATM cell of said sequence number. The table 108 is always updated.

The transmit cell management process 105D can identify a group (packet) including an ATM cell which fails in transmission, by the sequence number of the wrongly received or the lost ATM cell from the receiving station 200D, and the content of the table 108. Therefore, the transmit cell management process 105D can discard the rest of the ATM cells which belong to only a packet to be discarded.

This is described in accordance with FIG. 8. An ATM cell applied to a transmitting station 100D is applied to a transmit buffer 102 through an input means 101.

The transmit cell management process 105D assigns a sequence number for confirming correct arrival to an ATM cell stored in the transmit buffer 102. Further, the transmit cell management process 105D refers to the fields PT, VCI and VPI in the header of an ATM cell, so that a plurality of ATM cells belonging to a packet (CPCS-PDU) are handled as one group.

And, the transmit cell management process 105D writes in the table 108 the relations between a group which shows a specific packet and a sequence number which belongs to said group.

The ATM cell which is assigned a sequence number is transmitted into radio channel as a wireless ATM cell through a transmitter 103.

The receiving station 200D receives the wireless ATM cell, and send the same to the receive buffer 202 through the receiver 201. When the receive cell management process 204D confirms that the received cell is correct, the ATM cell in the receive buffer 202 is transferred to an external circuit through the output means 203.

The receive cell management process 204D sends the response ACK for a successful ATM cell or NAK for a failed ATM cell to the transmitting station 100D through the transmitter 205.

The response NAK sent through the transmitter 205 includes the sequence number of the wrongly received ATM cell.

The transmit cell management process 105D in the transmitting station 100D receives the response ACK/NAK and the sequence number sent by the receiving station 200D, through the receiver 104. The transmit cell management process 105D, upon detection of wrongly received ATM cell by the response NAK, identifies the group which the wrongly received ATM cell belongs to, based upon the sequence number informed by the receiving station 200D, and the data stored in the table 108.

Then, the transmit cell management process 105D discards all the ATM cells in the group which the wrongly received ATM cell belongs to, stored in the transmit buffer 102.

Then, an EOP cell generated by the EOP cell generator 106C is transmitted to the receiving station 200D through the transmitter 103. The EOP cell has the same data in the fileds PT, VPI and VCI as the corresponding data of the discarded ATM cell, but the bit SDU in the field PT of the EOP cell is 1 (one).

Effect of the Invention

As described above in detail, according to the present invention, an ATM cell which would be useless in a destination terminal equipment is found in a transmitting station, and is discarded with no transmission. Thus, the effective use of radio resource is obtained, as the transmission of useless ATM cell into radio channel is suppressed. Further, no useless traffic is applied to a network and/or a terminal.

Further, the present invention is available when a plurality of virtual channels (VP/VC) exist in a wireless circuit.

As mentioned above in detail, the present invention is advantageous when it is used in a wireless transmission circuit which has undesired large probability of error, and restricted bandwidth.

Of course, the present invention may be used not only in a wireless transmission circuit, but also a wired circuit.

Further, according to the present invention, when a transmitting station detects an ATM cell which is to be useless, no higher layer is terminated, but only an ATM layer. Thus, an apparatus may be small and control of the same is simplified.

As mentioned above in detail, an improved ATM transmission system has been found. It should be understood of course that the embodiments disclosed are merely illustrative and are not intended to limit the scope of the invention. Reference should be made, therefore, to the appended claims to find the scope of the invention.

What is claimed is:

1. An ATM transmission system comprising a transmitting station, a receiving station, a communication channel between said stations for transmitting an ATM cell, data communication with a protocol data unit (PDU) having a packet and a header being carried out by using an ATM adaptation layer (AAL) which can recognize an end of packet cell (EOP cell) in a PDU by referring to a header in said EOP cell, and a plurality of ATM cells which form said protocol data unit being continuously applied to said transmitting station,
wherein
said receiving station comprises;
an error detection means for detection whether an ATM cell is received correctly or wrongly,
a cell arrival informing means for informing the transmitting station the result of said detection,
said transmitting station comprises;
a transmit buffer for temporarily storing an ATM cell to be transmitted,
a group handling means for handling a plurality of ATM cells which form a protocol data unit in a common convergence sublayer as one group,
a receiving means of a said cell arrival information whether the ATM cell has been received correctly or wrongly from an associated receiving station,
a group data discard means for discarding all the ATM cells belonging to the group which includes a wrongly received ATM cell stored in said transmit buffer, when said receiving means receives the information of a wrongly received ATM cell,
an end of packet ATM cell (EOP cell) transmitting means for transmitting an EOP cell which has a flag in a payload type field in an ATM cell header, said flag indicating that the EOP cell is a final ATM cell in the protocol data unit of the group, when said group data discard means discards an ATM cell in said transmit buffer,
an ATM cell discard means for discarding an ATM cell which belongs to the discarded group and which arrives discard.

2. An ATM transmission system according to claim 1, wherein said transmitting station further comprises means for attaching sequence number to each ATM cell to be transmitted, and said error detection means in said receiving station detects whether a cell is received or lost by checking a sequence number of a received ATM cell.

3. An ATM transmission system according to claim 2, wherein
a communication channel between a transmitting station and a receiving station includes a plurality of virtual channels,
each virtual channel transmits ATM cells having different virtual path identifier and different virtual channel identifier,
a transmitting station and a receiving station establish a logical transmission link for each virtual channel of an ATM layer, and
said group handling means handles transmission and reception of an ATM cell for each established logical transmission link independently.

4. An ATM transmission system according to claim 2, wherein
a communication channel between a transmitting station and a receiving station includes a plurality of virtual channels, each virtual channel transmits ATM cells having different virtual path identifier and different virtual channel identifier, said receiving station comprises a sequence number informing means for informing sequence number of an ATM cell which is lost or wrongly received, to said transmitting station, said transmitting station comprises a table having relations between sequence number of an ATM cell and a group which said ATM cell belongs, and a group identify means for identifying a group which a wrongly received or lost ATM cell belongs, according to a sequence number informed by said receiving means and content of said table.

5. An ATM transmission system according to one of claims 1–4, wherein said transmitting station is a wireless transmitting station, and said receiving station is a wireless receiving station.

* * * * *